(12) United States Patent
Chen et al.

(10) Patent No.: US 6,618,359 B1
(45) Date of Patent: Sep. 9, 2003

(54) ERROR RECOVERY IN A MIXED PROTOCOL NETWORKS

(75) Inventors: Yue Long Chen, Nashua, NH (US); Richard Crump, Boston, MA (US); Mark F. Leary, Franklin, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/167,950

(22) Filed: Oct. 7, 1998

(51) Int. Cl.[7] .......................... H04L 12/26; H04L 12/56
(52) U.S. Cl. ...................... 370/242; 370/401; 370/466
(58) Field of Search ................. 370/216, 465, 370/466, 467, 235, 236, 241, 242, 243, 244, 245, 401, 400, 402; 709/227, 228, 230, 237, 246

(56) References Cited

U.S. PATENT DOCUMENTS

| | | | |
|---|---|---|---|
| 5,021,949 A | 6/1991 | Morten et al. ............... 364/200 |
| 5,023,873 A | 6/1991 | Stevenson et al. ........... 371/8.2 |
| 5,182,748 A | 1/1993 | Sakata et al. ............... 370/94.1 |
| 5,636,212 A | * 6/1997 | Ikeda .......................... 370/236 |
| 5,652,908 A | 7/1997 | Douglas et al. ............. 395/800 |
| 5,793,771 A | * 8/1998 | Darland et al. ............. 370/467 |
| 5,802,258 A | 9/1998 | Chen ..................... 395/182.08 |
| 5,838,989 A | 11/1998 | Hutchison et al. .......... 395/831 |
| 5,856,981 A | 1/1999 | Voelker ...................... 371/20.1 |
| 5,918,017 A | 6/1999 | Attanasio et al. ...... 395/200.54 |
| 5,918,022 A | 6/1999 | Batz et al. ............. 395/200.66 |
| 5,933,422 A | 8/1999 | Kusano et al. .............. 370/331 |
| 5,943,481 A | * 8/1999 | Wakeland .................... 709/230 |
| 6,044,407 A | * 3/2000 | Jones et al. ................. 709/246 |
| 6,098,116 A | 8/2000 | Nixon et al. .................... 710/8 |
| 6,192,409 B1 | * 2/2001 | Kim ........................... 709/230 |

OTHER PUBLICATIONS

"TCP Connection Establishment and Termination," TCP/IP Illustrated, vol. 1, W. Richard Stevens, Dec. 1994, pp. 229–234.

* cited by examiner

*Primary Examiner*—Chau Nguyen
*Assistant Examiner*—Soon-Dong Hyun
(74) *Attorney, Agent, or Firm*—Withrow & Terranova, PLLC

(57) ABSTRACT

A method, translating apparatus, apparatus comprising a computer readable medium, and system for error recovery in a mixed protocol communication network includes a translation function that communicates with a first device using a first communication protocol and a second device using a second communication protocol. When the translation function determines that a connection failure occurred between the translation function and the second device, the translation function completes a first link reset procedure with the first device to suspend data flow between the first device and the translation function, completes a connection establishment procedure with the second device to establish a connection between the translation function and the second device, and then completes a second link reset procedure with the first device to enable data flow between the first device and the translation function.

22 Claims, 4 Drawing Sheets

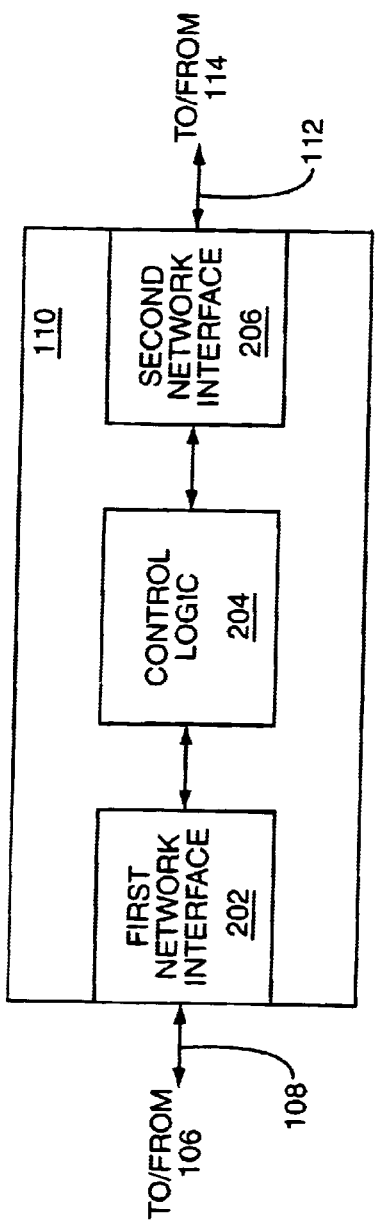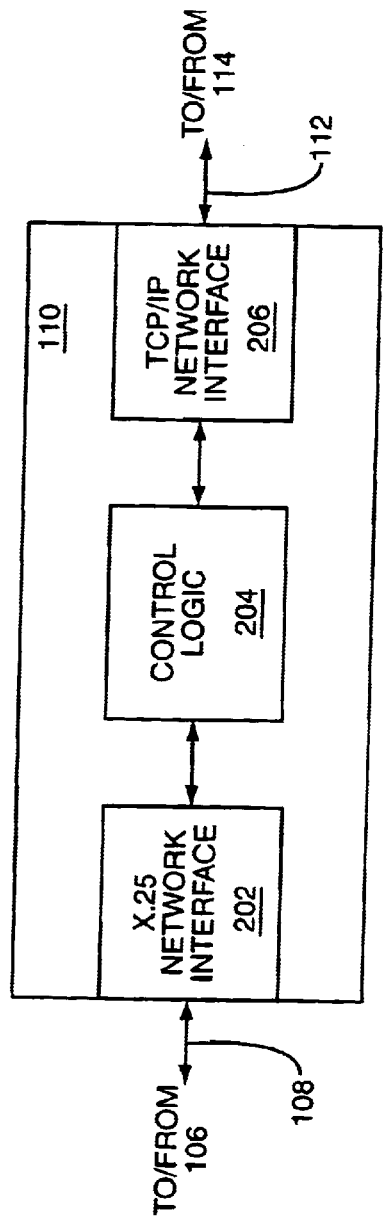

ERROR RECOVERY IN A MIXED PROTOCOL NETWORKS

CROSS-REFERENCES TO RELATED APPLICATIONS

This patent application may be related to the following commonly-owned United States patent applications:

U.S. patent application Ser. No. 09/167,916 entitled CONNECTION ESTABLISHMENT AND TERMINATION IN A MIXED PROTOCOL NETWORK, filed on even date herewith, and hereby incorporated by reference in its entirety;

U.S. patent application Ser. No. 09/167,839 entitled ESTABLISHING AND TERMINATING CONNECTIONS IN A MIXED PROTOCOL NETWORK, filed on even date herewith, and hereby incorporated by reference in its entirety;

U.S. patent application Ser. No. 09/167,792 entitled SYSTEM FOR TRANSLATING A MESSAGE FROM A FIRST TRANSMISSION PROTOCOL TO A SECOND TRANSMISSION PROTOCOL, filed on even date herewith, and hereby incorporated by reference in its entirety;

U.S. patent application Ser. No. 09/167,746 entitled EFFICIENT RECOVERY OF MULITPLE CONNECTIONS IN A COMMUNICATION NETWORK, filed on even date herewith, and hereby incorporated by reference in its entirety; and U.S. patent application Ser. No. 09/167,811 entitled TRANSLATOR MEMORY MANAGEMENT SYSTEM, filed on even date herewith, and hereby incorporated by reference in its entirety.

FIELD OF THE INVENTION

The present invention relates generally to data communication networks, and, more particularly, to error recovery in a mixed protocol network.

BACKGROUND OF THE INVENTION

In today's information age, data communication networks are becoming ever more pervasive as an ever-increasing number of communication consumers require access to on-line computer resources. To that end, many data communication networks are evolving to meet the needs of these communication consumers. As these data communication networks evolve, it often becomes necessary to combine or integrate network segments that support different communication protocols.

The most common problem that arises when integrating or combining network segments that utilize different protocols is that the devices on one network segment using a first communication protocol do not communicate with the devices on another network segment using a second communication protocol. One solution is to convert or replace devices so that all devices utilize a common communication protocol. Unfortunately, this is often expensive, time-consuming, and disruptive to the network users. Furthermore, such conversion or replacement often requires that end-user applications be changed, which can further complicate the integration process and force end-users to learn new applications. Thus, a need has remained for a translation function that allows the devices utilizing the first communication protocol to communicate with the devices using the second communication protocol.

SUMMARY OF THE INVENTION

In accordance with one aspect of the invention, a method, translating apparatus, apparatus comprising a computer readable medium, and system for error recovery in a mixed protocol network includes a translation function that communicates with a first device using a first communication protocol and a second device using a second communication protocol. When the translation function determines that a connection failure occurred between the translation function and the second device, the translation function completes a first link reset procedure with the first device to suspend data flow between the first device and the translation function, completes a connection establishment procedure with the second device to establish a connection between the translation function and the second device, and then completes a second link reset procedure with the first device to enable data flow between the first device and the translation function.

In one exemplary embodiment, the translation function determines that a connection failure occurred when an attempt to establish a connection between the translation function and the second device fails.

In another exemplary embodiment, the translation function determines that a connection failure occurred when an existing connection between the translation function and the second device fails.

In yet another exemplary embodiment, the translation function determines that a connection failure occurred when an existing connection between the translation function and the second device is explicitly terminated.

In a preferred embodiment of the invention, the first communication protocol is an X.25 protocol. In such a preferred embodiment, completing the first link reset procedure with the first device to suspend data flow between the first device and the translation function involves transmitting to the first device an X.25 reset message indicating that the network is out of order and receiving from the first device an X.25 confirm message. Also in such a preferred embodiment, completing the second link reset procedure with the first device to enable data flow between the first device and the translation function involves transmitting to the first device an X.25 reset message indicating that the network is operational and receiving from the first device an X.25 confirm message.

In a preferred embodiment of the invention, the second communication protocol is a Transmission Control Protocol (TCP). In such a preferred embodiment, completing the connection establishment procedure with the second device to establish a connection between the translation function and the second device involves transmitting to the second device a first TCP SYN message, receiving from the second device a second TCP SYN message, and transmitting to the second device a TCP SYN/ACK message.

BRIEF DESCRIPTION OF THE DRAWINGS

The foregoing and other objects and advantages of the invention will be appreciated more fully from the following further description thereof with reference to the accompanying drawings wherein:

FIG. 2A is a block diagram of an exemplary translating apparatus including a first network interface for communicating with a first device over a first communication protocol network and a second network interface for communicating with a second device over a second communication protocol network;

FIG. 2B is block diagram of a preferred embodiment of the exemplary translating apparatus including an X.25 network interface for communicating with an X.25 device over an X.25 network and a TCP/IP network interface for communicating with a TCP device over a TCP/IP network;

DETAILED DESCRIPTION OF A PREFERRED EMBODIMENT

As discussed above, a need has remained for a translation function that allows the devices using the first communication protocol to communicate with the devices using the second communication protocol. The present invention provides such a translation function by communicating with a first number of devices using the first communication protocol, communicating with a second number of devices using the second communication protocol, and performing appropriate protocol operations to allow end-to-end connections between devices using the first and second communication protocols to be established and terminated.

Figure 1A:
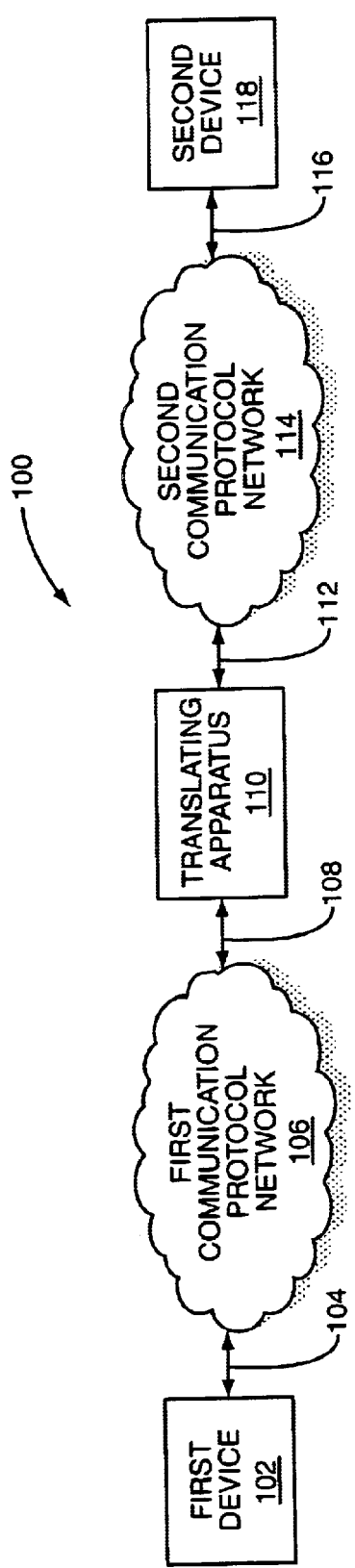
FIG. 1A is a block diagram of an exemplary data communication network in which a translating apparatus is used to allow a first device, which communicates with the translating apparatus over a first communication protocol network, to communicate with a second device, which communicates with the translating apparatus over a second communication protocol network.

FIG. 1A is a block diagram of an exemplary data communication network 100 in which a first device 102 that utilizes a first communication protocol communicates with a second device 118 that utilizes a second communication protocol through a translating apparatus 110. More specifically, the first device 102 is coupled to a first communication protocol network 106 by way of a first link 104. The translating apparatus 110 is also coupled to the first communication protocol network 106 by way of a second link 108. The first device 102 communicates with the translating apparatus 110 over the first communication protocol network 106 using the first communication protocol, and, in particular, over a connection that is established between the first device 102 and the translating apparatus 110.

Continuing to refer to FIG. 1, the second device 118 is coupled to a second communication protocol network 114 by way of a third link 116. The translating apparatus 110 is also coupled to the second communication protocol network 114 by way of a fourth link 112. The second device 118 communicates with the translating apparatus 110 over the second communication protocol network 114 using the second communication protocol, and in particular over a connection that is established between the second device 118 and the translating apparatus 110.

FIG. 2A is a block diagram of an exemplary translating apparatus 110 in accordance with a preferred embodiment of the present invention. The translating apparatus 110 includes a first network interface 202 that is couplable to the second link 108. The first network interface 202 includes logic enabling the translating apparatus 110 to communicate with the first device 102 over the first communication protocol network 106. More specifically, the first network interface 202 includes logic for receiving first communication protocol messages from the second link 108, and further includes logic for transmitting first communication protocol messages generated within the translating apparatus 110 onto the second link 108.

Continuing to refer to FIG. 2A, the translating apparatus 110 also includes a second network interface 206 that is couplable to the fourth link 112. The second network interface 206 includes logic enabling the translating apparatus 10 to communicate with the second device 118 over the second communication protocol network 114. More specifically, the second network interface 206 includes logic for receiving second communication protocol messages from the fourth link 112, and further includes logic for transmitting second communication protocol messages generated within the translating apparatus 110 onto the fourth link 112.

Still referring to FIG. 2A, the translating apparatus 110 further includes control logic 204. The control logic 204 performs a translation function to allow the first device 102 to communicate with the second device 118. The control logic 204 is operably coupled to the first network interface 202, through which the control logic 204 receives and transmits first communication protocol messages. The control logic 204 is also operably coupled to the second network interface 206, through which the control logic 204 receives and transmits second communication protocol messages.

In accordance with a preferred embodiment of the present invention, the first communication protocol is a protocol known as the X.25 protocol. The X.25 protocol defines the physical, link, and network layer protocols (layers one, two, and three) of the International Standards Organization (ISO) seven-layer protocol model. In a communication network that utilizes the X.25 protocol (referred to herein as an "X.25 network"), two devices (referred to herein as an "X.25 device" or "X.25 devices") exchange X.25 network layer messages (referred to in X.25 as "packets") over a virtual circuit that is established across the X.25 network. One type of virtual circuit commonly used in the X.25 network is a permanent virtual circuit or PVC. A PVC is a virtual circuit that is set up automatically within the X.25 network and remains active as long as the X.25 network is operative (as opposed to a switched virtual circuit or SVC, which is set up only when explicitly requested by an X.25 device). Typical X.25 networks support multiple virtual circuits, both permanent and switched.

In accordance with a preferred embodiment of the present invention, the second communication protocol is a protocol known as the Transmission Control Protocol (referred to hereinafter as "TCP"). TCP is a connection-oriented transport layer protocol that is generally used in conjunction with a connectionless network layer protocol known as the Internet Protocol or IP. In a communication network that utilizes the TCP protocol (referred to herein as a "TCP/IP network"), two devices (referred to herein as a "TCP device" or "TCP devices") exchange TCP messages (referred to in TCP as "segments") over a TCP connection that is established across the TCP/IP network. In order to set up the TCP connection within the TCP/IP network, two TCP devices exchange specially formatted messages that include, among other things, an IP address identifying the destination TCP device and a TCP port number identifying one of a number of applications supported by the destination TCP device. The combination of IP address and TCP port number is referred to hereinafter as a "socket." Because the TCP connection is set up only when explicitly requested by a TCP device, the TCP connection is considered to be a switched connection as opposed to a permanent connection.

Figure 1B:
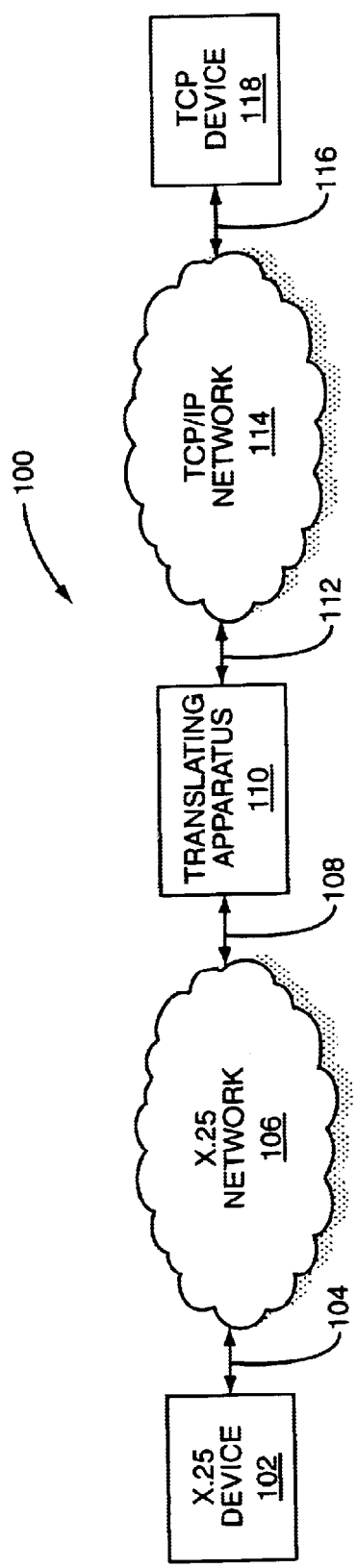
FIG. 1B is a block diagram of a preferred embodiment of the exemplary data communication network in which the translating apparatus is used to allow an X.25 device, which communicates with the translating apparatus over an X.25 network, to communicate with a TCP device, which communicates with the translating apparatus over a TCP/IP network.

FIG. 1B shows a preferred embodiment of the data communication network 100 in which the first communication protocol is the X.25 protocol and the second communication protocol is the TCP protocol. Thus, in accordance with a preferred embodiment of the present invention as shown in FIG. 1B, the X.25 device 102 communicates with the translating apparatus 110 across an X.25 network 106 using the X.25 protocol, and the TCP device 118 communicates with the translating apparatus 110 across a TCP/IP network 114 using the TCP protocol. The preferred translating apparatus 110, as shown in FIG. 1B, therefore includes an X.25 network interface 202 that includes an X.25 protocol stack for interfacing with the X.25 network 106 and a TCP/IP network interface 206 that includes a TCP/IP protocol stack for interfacing with the TCP/IP network 114.

In order for the X.25 device 102 to communicate with the TCP device 118 within the data communication network 100, it is necessary for an end-to-end connection to be established between the X.25 device 102 and the TCP device 118. In order for an end-to-end connection to exist between the X.25 device 102 and the TCP device 118, there must be both an active X.25 connection between the X.25 device 102 and the translating apparatus 110 and an active TCP connection between the translating apparatus 110 and a particular socket in the TCP device 118 (referred to hereinafter as the "destination socket"). In accordance with a preferred embodiment of the present invention, the X.25 device 102 communicates with the translating apparatus 110 over a dedicated X.25 PVC, and therefore an active X.25 connection exists between the X.25device 102 and the translating apparatus 110 as long as the X.25 network 106 is operative. On the other hand, because the TCP device 118 communicates with the translating apparatus 110 over a switched TCP connection, the TCP connection between the translating apparatus 110 and the destination socket is established dynamically.

Furthermore, in order for the translating device 110 to provide an end-to-end connection between the X.25 device 102 and the TCP device 118, the translating apparatus 110, and particularly the control logic 204, maintains a map associating the X.25 PVC with the destination socket. In accordance with a preferred embodiment of the present invention, one X.25 PVC maps to one destination socket, and multiple X.25 PVCs can map to the same destination socket. Application data received from the X.25 device 102 over the X.25 PVC is transmitted by the translating apparatus 110, and particularly by the control logic 204, to the TCP device 118 over the corresponding TCP connection. Likewise, application data received from the TCP device 118 over the TCP connection is transmitted by the translating apparatus 110, and particularly by the control logic 204, to the X.25 device 102 over the corresponding X.25 PVC. Exemplary embodiments of control logic 204 for transferring application data between the X.25 device 102 and the TCP device 118 are described in the related U.S. patent applications Ser. Nos.2204/105 and 2204/107.

When communication between the X.25 device 102 and the TCP device 118 is completed, it is often desirable for the end-to-end connection between the X.25 device 102 and the TCP device 118 to be terminated. Because the X.25 device 102 communicates with the translating apparatus 110 over a dedicated X.25 PVC, the X.25 connection between the X.25 device 102 and the translating apparatus 110 cannot be terminated. On the other hand, because the TCP device 118 communicates with the translating apparatus 110 over a switched TCP connection, the TCP connection between the translating apparatus 110 and a particular socket in the TCP device 118 is terminated dynamically.

In the data communication network 100, connection establishment and termination may be initiated by either the X.25 device 102 or the TCP device 118. The related U.S. patent application Ser. No. 09/167,416 describes a first exemplary embodiment in which the X.25 device 102 initiates connection establishment and termination. The related U.S. patent application Ser. No. 09/167,839 describes a second exemplary embodiment in which the TCP device 118 initiates connection establishment and termination.

Under certain circumstances, an attempt to establish a TCP connection between the translating apparatus 110 and the TCP device 118 may fail. For example, in the connection establishment mechanism described in the related U.S. patent application Ser. No. 09/167,416 in which the translating apparatus 110 performs a TCP open procedure with the TCP device 118 upon receiving an X.25 data packet from the X.25 device 102, it is conceivable that message transfers between the translating apparatus 110 and the TCP device 118 will be lost, resulting in a failure of the translating apparatus 110 to establish the TCP connection with the TCP device 118. If this occurs, it is desirable for the translating apparatus 110 to suspend data flow between the X.25 device 102 and the translating apparatus 118, repeat the TCP connection establishment mechanism until a TCP connection is established between the translating apparatus 110 and the TCP device 118, and then enable data flow between the X.25 device 102 and the translating apparatus 118.

Under other circumstances, an existing TCP connection between the translating apparatus 110 and the TCP device 118 may fail or be explicitly terminated. For example, a network error may cause the existing TCP connection to be dropped, or the existing TCP connection may be explicitly terminated using the connection termination mechanism described in the related U.S. patent application Ser. No. 09/167,839 If an existing TCP connection is lost or terminated, it is often desirable for the translating apparatus 110 to suspend data flow between the X.25 device 102 and the translating apparatus 118, repeat the TCP connection establishment mechanism until a TCP connection is established between the translating apparatus 110 and the TCP device 118 or other TCP device, and then enable data flow between the X.25 device 102 and the translating apparatus 118.

Figure 3:
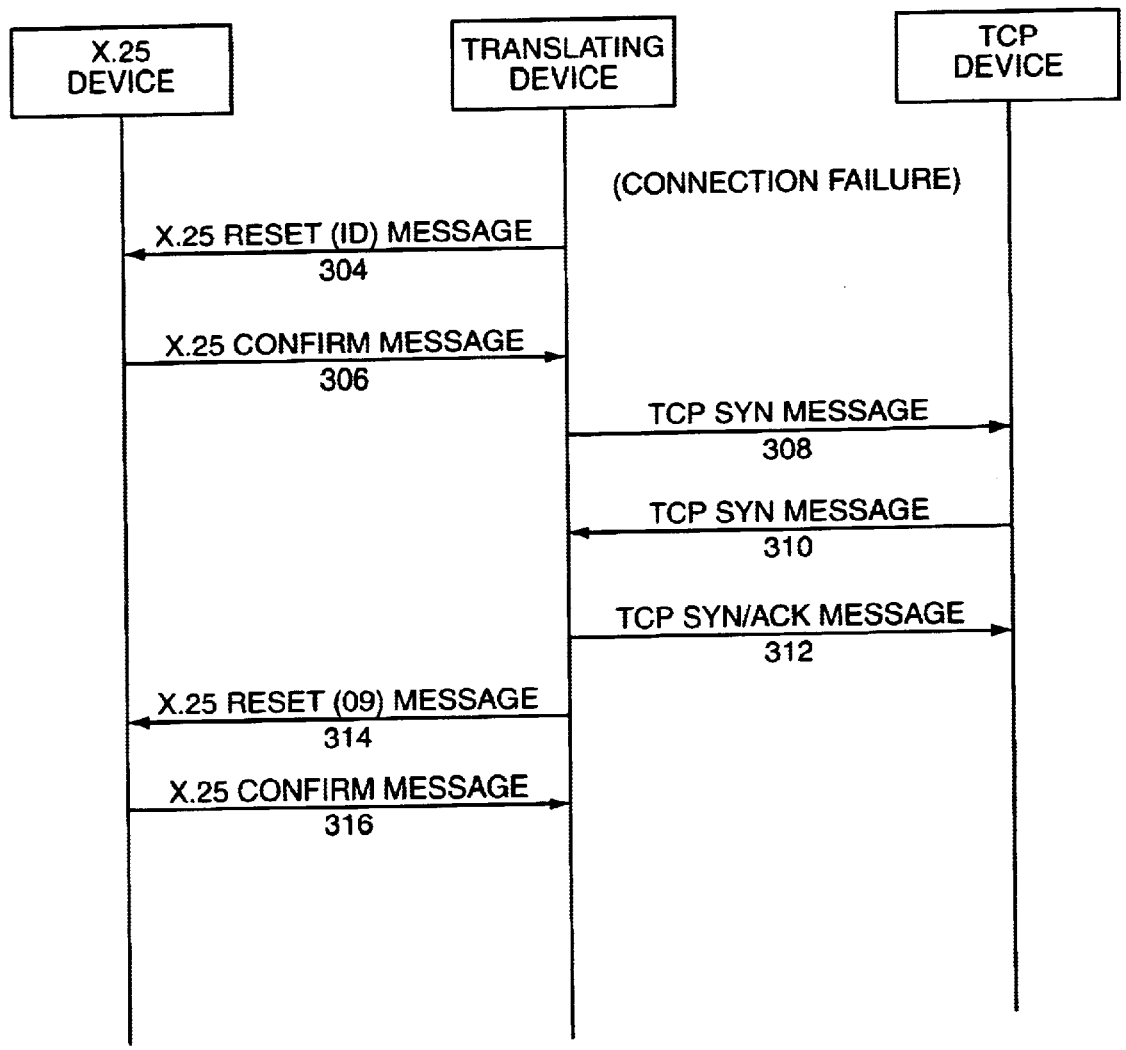
FIG. 3 is a message flow diagram for recovering from a connection failure in accordance with a preferred embodiment of the present invention.

Thus, there is a need for an error recovery mechanism within the communication network 100 in which the translating apparatus 10 suspends data flow between the X.25 device 102 and the translating apparatus 118, establishes a TCP connection with the TCP device 118 or other TCP device, and then enables data flow between the X.25 device 102 and the translating apparatus 118. A message flow diagram for a preferred error recovery mechanism is shown in FIG. 3. Upon detecting a TCP connection failure (302), the translating apparatus 110 completes a first link reset procedure with the X.25 device 102 in order to suspend data flow between the X.25 device 102 and the translating apparatus 110. Specifically, the translating apparatus transmits to the X.25 device 102 an X.25 reset message 304 including an indicator indicating that the network is out of order and receives from the X.25 device 102 an X.25 confirm message 306. In accordance with a preferred embodiment of the present invention, the indicator indicating that the network is out of order is equal to the hexadecimal value 1D.

After completing the first link reset procedure with the X.25 device 102, the translating apparatus 110 completes a TCP connection establishment procedure with the TCP device 118 or other TCP device. Specifically, completing the TCP connection establishment procedure involves transmitting a TCP SYN message 308 to the TCP device 118, receiving a TCP SYN message 310 from the TCP device 118, and transmitting a TCP SYN/ACK message 312 to the TCP device 118. In accordance with a preferred embodiment of the present invention, the TCP SYN message 308 may have to be transmitted repeatedly before the TCP SYN message 310 is received from the TCP device 118. Once a TCP connection is established, the translating apparatus 110 completes a second link reset procedure with the X.25 device 102 in order to enable data flow between the X.25 device 102 and the translating apparatus 110. Specifically, the translating apparatus transmits to the X.25 device 102 an X.25 reset message 314 including an indicator indicating that the network is operational and receives from the X.25 device 102 an X.25 confirm message 316. In accordance with a preferred embodiment of the present invention, the indicator indicating that the network is operational is equal to the hexadecimal value 09.

Figure 4:
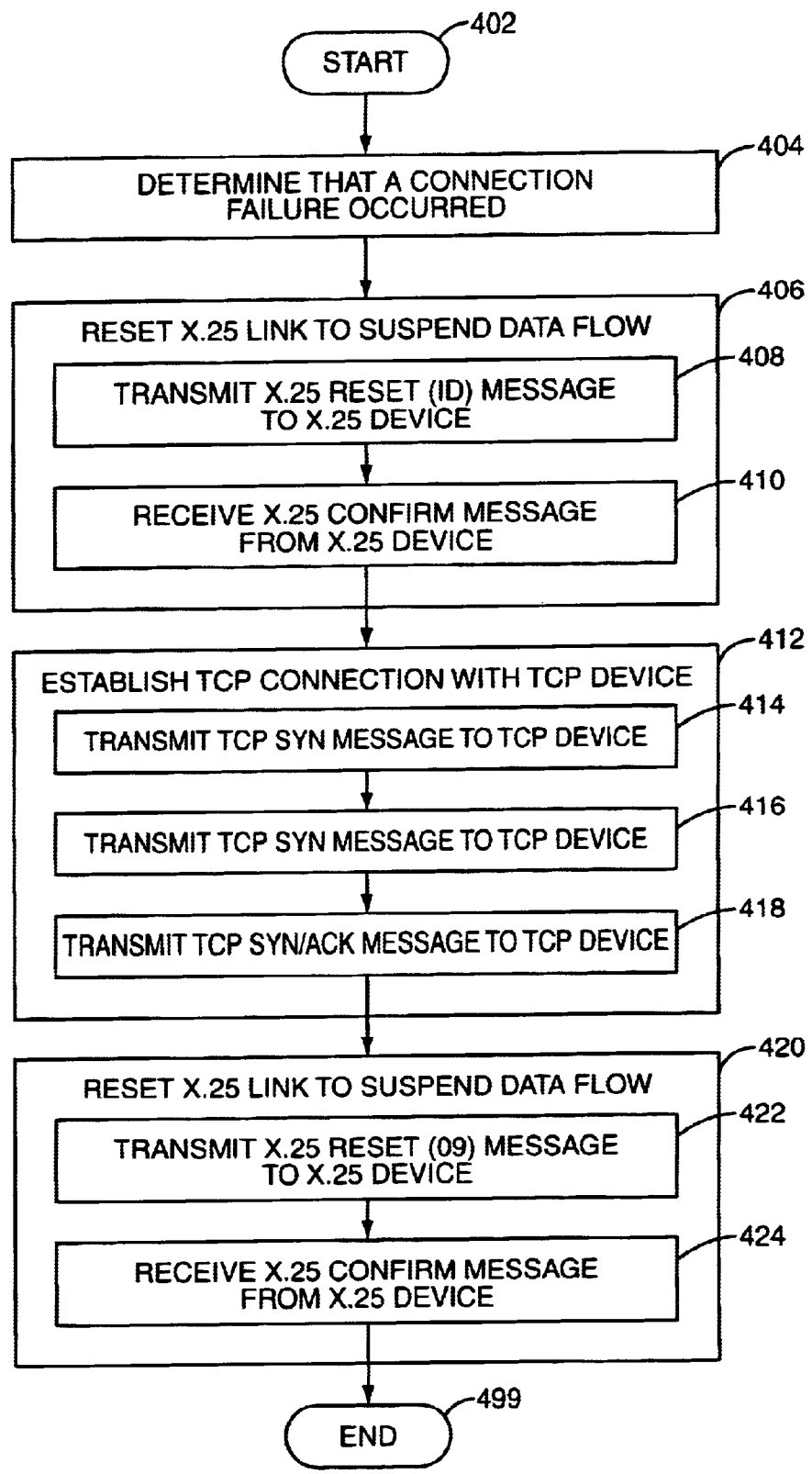
FIG. 4 is a logic flow diagram of exemplary control logic for recovering from a connection failure in accordance with a preferred embodiment of the present invention.

Thus, the translating apparatus 110, and particularly the control logic 204, includes error recovery logic to recover from a failed TCP connection. More specifically, the control logic 204 includes logic for performing a set of steps as shown in FIG. 4. Beginning at step 402, and upon determining that a TCP connection failure occurred in step 404, the control logic 204 completes a first link reset procedure to suspend data flow between the X.25 device 102 and the translating apparatus 110, in step 406. As described above, completing the first link reset procedure in step 406 involves transmitting to the X.25 device 102 the X.25 reset message 304 including an indicator indicating that the network is out of order (step 408) and receiving from the X.25 device 102 the X.25 confirm message 306 (step 410). After completing the first link reset procedure with the X.25 device 102 in step 406, the translating apparatus 110 completes a TCP connection establishment procedure with the TCP device 118 or other TCP device, in step 412. As described above, completing the TCP connection establishment procedure in step 412 involves transmitting the TCP SYN message 308 to the TCP device 118 (step 414), receiving the TCP SYN message 310 from the TCP device 118 (step 416), and transmitting the TCP SYN/ACK message 312 to the TCP device 118 (418). In accordance with a preferred embodiment of the present invention, the step of transmitting the TCP SYN message 308 to the TCP device 118 in step 414 may have to be repeated indefinitely before the TCP SYN message 310 is received from the TCP device 118 in step 416. Once a TCP connection is established in step 412, the translating apparatus 110 completes a second link reset procedure with the X.25 device 102 in order to enable data flow between the X.25 device 102 and the translating apparatus 110, in step 420. As described above, completing the second link reset procedure in step 420 involves transmitting to the X.25 device 102 the X.25 reset message 314 including an indicator indicating that the network is operational (step 422) and receiving from the X.25 device 102 the X.25 confirm message 316 (step 424). The control logic 204 terminates in step 499.

Although the various embodiments are described with specific reference to a translating apparatus for enabling communication between an X.25 device and a TCP device, it will be apparent to a skilled artisan that the techniques of the present invention apply more generally to a translating apparatus for enabling communication between two devices supporting different communication protocols. Thus, the translating apparatus enables communication between a first device utilizing a first communication protocol and a second device utilizing a second communication protocol. More specifically, the first device communicates with the translating apparatus using the first communication protocol, and the second device communicates with the translating apparatus using the second communication protocol. The translating apparatus performs the functions necessary to establish an end-to-end connection between the first device and the second device, for example, as described in the related U.S. patent applications Ser. No. 09/167,416 and 09/167,839; terminate an end-to-end connection between the first device and the second device, for example, as described in the related U.S. patent applications Ser. No. 09/167,416 and 09/167,839, recover from a connection failure, for example, as described herein and in the related U.S. patent application Ser. No. 09/167,746; and exchange application data, for example, as described in the related U.S. patent application Ser. No. 09/167,792 and 09/167,811.

In a preferred embodiment of the present invention, the control logic 204 is implemented as a set of program instructions that are stored in a computer readable memory within the translating apparatus 110 and executed on a microprocessor within the translating apparatus 110. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific forms without departing from the essence or essential characteristics. The described embodiments are to considered in all respects only as illustrative and not restrictive.

We claim:

1. A method of recovering from a connection failure in a translating apparatus having a first communication interface for communicating with a first device using a first communication protocol for a permanent virtual circuit and a second connection oriented communication interface for communicating with a second device using a second communication protocol different from said first communication protocol, the method comprising:

determining that a connection failure occurred between said translating apparatus and a socket of said second device;

completing a first link reset procedure with said first device over said first communication interface to suspend data flow between said first device and said translating apparatus;

completing a connection establishment procedure with said socket of said second device over said second communication interface to establish a connection between said translating apparatus and said second device; and completing a second link reset procedure with said first device over said first communication interface to enable data flow between said first device and said translating apparatus.

2. The method of claim 1 wherein said second communication protocol comprises a Transmission Control Protocol (TCP) and wherein the step of determining that a connection failure occurred between said translating apparatus and said second device comprises determining that a TCP open procedure failed to establish a connection between said translating apparatus and said second device.

3. The method of claim 1 wherein said second communication protocol comprises a Transmission Control Protocol (TCP) and wherein the step of determining that a connection failure occurred between said translating apparatus and said second device comprises determining that an existing TCP connection between said translating apparatus and said second device failed.

4. The method of claim 1 wherein said second communication protocol comprises a Transmission Control Protocol (TCP) and wherein the step of determining that a connection failure occurred between said translating apparatus and said second device comprises determining that an existing TCP connection between said translating apparatus and said second device was terminated by said second device.

5. The method of claim 1 wherein said second communication protocol comprises a Transmission Control Protocol (TCP) and wherein the step of completing the connection establishment procedure faith said second device over said second communication interface comprises the steps of:
   transmitting to said second device over said second communication interface a first TCP SYN message;
   receiving from said second device over said second communication interface a second TCP SYN message; and
   transmitting to said second device over said second communication interface a TCP SYN/ACK message.

6. The method of claim 1 wherein said first communication protocol comprises an X.25 protocol and wherein the step of completing the first fink reset procedure with said first device over said, first communication interface comprises the steps of:
   transmitting to said first device over said first communication interface an X.25 reset message including an indicator indicating that a network is out of order; and
   receiving from said first device over said first communication interface an X.25 confirm message.

7. The method of claim 1 wherein said first communication protocol comprises an X.25 protocol and wherein the step of completing the second link reset procedure with said first device over said first communication interface comprises the steps of:
   transmitting to said first device over said first communication interface an X.25 reset message including an indicator indicating that a network is operational; and
   receiving from said first device over said first communication interface an X.25 confirm message.

8. A translating apparatus comprising a computer readable medium having embodied therein computer readable program code means for communicating with a first device using a first communication protocol for a permanent virtual circuit, communicating with a second device using a second connection oriented communication protocol different from said first communication protocol, translating therebetween, and recovering from a connection failure with said second device, the computer readable program code means comprising:

computer readable program code means for determining that a connection failure occurred with a socket of said second device;

computer readable program code means for completing a first link reset procedure with said first device to suspend data flow with said first device;

computer readable program code means for completing a connection establishment procedure with said socket of said second device to establish a connection with said second device; and computer readable program code means for completing a second link reset procedure with said first device to enable data flow with said first device.

9. A translating apparatus comprising:

a first communication interface couplable to a first device for communicating with said first device using a first communication protocol for a permanent virtual circuit;

a second communication interface couplable to a second device for communicating with a socket of said second device using a second correction oriented communication protocol different from said first communication protocol; and control logic coupled to said first communication interface and said second communication interface, said control logic comprising:

logic for determining that a connection failure occurred between said translating apparatus and said second device;

logic for completing a first link reset procedure with said first device over said first communication interface to suspend data flow between said first device and said translating apparatus;

logic for completing a connection establishment procedure with said socket of said second device over said second communication interface to establish a connection between said translating apparatus and said second device; and logic for completing a second link reset procedure with said first device over said first communication interface to enable data flow between said first device and said translating apparatus.

10. The translating apparatus of claim 9 wherein said second communication protocol comprises a Transmission Control Protocol (TCP) and wherein said logic for determining that a connection failure occurred between said translating apparatus and said second device comprises logic for determining that a TCP open procedure failed to establish a connection between said translating apparatus and said second device.

11. The transacting apparatus of claim 9 wherein said second communication protocol comprises a Transmission Control Protocol (TCP) and wherein said logic for determining that a connection failure occurred between said translating apparatus and said second device comprises logic for determining that an existing TCP connection between said translating apparatus and said second device failed.

12. The translating apparatus of claim 9 wherein said second communication protocol comprises a Transmission Control Protocol (TCP) and wherein said logic for determining that a connection failure occurred between said translating apparatus and said second device comprises logic for determining that an existing TCP connection between said translating apparatus and said second device was terminated by said second device.

13. The translating apparatus of claim 9 wherein said second communication protocol comprises a Transmission Control Protocol (TCP) and wherein said logic for completing the connection establishment procedure with said second device over said second communication interface comprises:

logic for transmitting to said second device over said second communication interface a first TCP SYN message;

logic for receiving from said second device over said second communication interface a second TCP SYN message; and logic for transmitting to said second device over said second communication interface a TCP SYN/ACK message.

14. The translating apparatus of claim 9 wherein said first communication protocol comprises an X.25 protocol and wherein said logic for completing the first link reset procedure with said first device over said first communication interface comprises:

logic for transmitting to said first device over said fist communication interface an X.25 reset message including an indicator indicating that a network is out of order; and logic for receiving said first device over said first communication interface an X.25 confirm message.

15. The translating apparatus of claim 9 wherein said first communication protocol comprises and X.25 protocol and wherein said logic for completing the second link reset procedure with said first device over said first communication interface comprises:

logic for transmitting to said first device over said first communication interface an X.25 reset message including an indicator indicating that a network is operational; and logic for receiving from said first device over said first communication interface an X.25 confirm message.

16. A method of terminating a connection between a first device and a second device, wherein said first device is in communication with a translating apparatus using a first communication protocol for a permanent virtual circuit and said second device is in communication with said translating apparatus using a second connection oriented communication protocol different from said first communication protocol, the method comprising:

determining, by the translating apparatus, that a connection failure occurred between said translating apparatus and said second device;

completing a first link reset procedure between said translating apparatus and said first device to suspend data flow between said first device and said translating apparatus;

completing a connection establishment procedure between said translating apparatus and a socket of said second device to establish a connection between said translating apparatus and said second device; and completing a second link reset procedure between said translating apparatus and said first device to enable data flow between said first device and said translating apparatus.

17. The method of claim 16 wherein said second communication protocol comprises a Transmission Control Protocol (TCP) and wherein the step of determining that a connection failure occurred between said translating apparatus and said second device comprises determining that a TCP open procedure failed to establish a connection between said translating apparatus and said second device.

18. The method of claim 16 wherein said second communication protocol comprises a Transmission Control Protocol (TCP) and wherein the step of determining that a connection failure occurred between said translating apparatus and said second device comprises determining that an existing TCP connection between said translating apparatus and said second device failed.

19. The method of claim 16 wherein said second communication protocol comprises a Transmission Control Protocol (TCP) and wherein the step of determining that a connection failure occurred between said translating apparatus and said second device comprises determining that an existing TCP connection between said translating apparatus and said second device was terminated by said second device.

20. The method of claim 16 wherein said second communication protocol comprises a Transmission Control Protocol (TCP) and wherein the step of completing the connection establishment procedure with said second device over said second communication interface comprises the steps of:

transmitting, by said translating apparatus to said second device, a first TCP SYN message;

receiving said first TCP SYN message by said second device;

transmitting, by said second device to said translating apparatus, a second TCP SYN message;

receiving said second TCP SYN message by said translating apparatus; and transmitting, by said translating apparatus to said second device, a TCP SYN/ACK message.

21. The method of claim 16 wherein said first communication protocol comprises an X.25 protocol and wherein the step of completing the first link reset procedure with said first device comprises the steps of:

transmitting, by staid translating apparatus to said first device, an X.25 reset message including an indicator indicating that a network is out of order;

receiving said X.25 reset message by said first device;

transmitting, by said first device to said translating apparatus, an X.25 confirm message; and receiving said X.25 confirm message by said translating apparatus.

22. The method of claim 16 wherein said first communication protocol comprises an X.25 protocol and wherein the step of completing the second link reset procedure with said first device comprises the steps of:

transmitting, by said translating apparatus to said first device, an X.25 reset message including an indicator indicating that a network is operational;

receiving said X.25 reset message by said first device;

transmitting, by said first device to said translating apparatus, an X.25 confirm message; and receiving said X.25 confirm message by said translating apparatus.

* * * * *